United States Patent [19]

Grotts et al.

[11] Patent Number: 4,593,187
[45] Date of Patent: Jun. 3, 1986

[54] NON-IMAGING ILLUMINATION INCIDENCE ANGLE DETECTION SYSTEM

[75] Inventors: Jeffrey W. Grotts, Bethel; Rene Abreu, New Fairfield, both of Conn.

[73] Assignee: The Perkin-Elmer Corporation, Norwalk, Conn.

[21] Appl. No.: 437,721

[22] Filed: Oct. 29, 1982

[51] Int. Cl.⁴ .............................................. G01J 1/20
[52] U.S. Cl. ............................ 250/203 R; 250/211 K; 250/578; 356/141
[58] Field of Search ............... 250/211 K, 203 R, 578; 73/178 T; 356/141, 152

[56] References Cited

U.S. PATENT DOCUMENTS

| | | | |
|---|---|---|---|
| 3,033,073 | 5/1962 | Shuttleworth | 250/211 K |
| 3,649,840 | 3/1972 | Thorn et al. | 250/211 K |
| 3,651,252 | 3/1972 | Land et al. | 250/578 |
| 4,314,761 | 2/1982 | Reymond et al. | 356/141 |
| 4,325,633 | 4/1982 | Gardner | 356/141 |
| 4,410,270 | 10/1983 | Zuckerman | 356/141 |

Primary Examiner—David C. Nelms
Assistant Examiner—Jim Gatto
Attorney, Agent, or Firm—Thomas P. Murphy; Edwin T. Grimes; Francis L. Masselle

[57] ABSTRACT

A non-imaging detector for directly measuring the angle of incidence of irradiation in one plane from an illuminating source. The detector includes a slit mask that transmits narrow lines of irradiation across an array of detectors closely underlying the slit mask. The detectors are configured to generate photocurrents whose ratio exponentially increase as the irradiation lines through the slits move along the array in response to changes in angle of incidence. The detectors are configured according to an exponential formula so that adjacent rows of detectors produce photocurrents so that the photocurrent log difference from adjacent rows will result in a signal directly proportional to incidence angle when subtracted by associated circuitry.

7 Claims, 2 Drawing Figures

NON-IMAGING ILLUMINATION INCIDENCE ANGLE DETECTION SYSTEM

BACKGROUND OF THE INVENTION

This invention relates generally to illumination detection and more specifically to a non-imaging detector for directly measuring the incidence angle of an illuminating source from a plane normal to the detector.

The detector and its relatively simple electronic circuitry will generate an output signal having an amplitude that is proportional to the angle that an illuminating source, such as an aircraft landing light or distant aircraft strobe light, is displaced from one plane normal to the surface of the detector. For example, the detector may be positioned and aligned to detect an azimuth angle from a particular reference, such as an airport runway heading, and when subjected to irradiation from an aircraft landing light, will produce an output signal that is proportional to the azimuth angle of the aircraft from the runway heading. If the measurement of a horizontal angle of approach is required, a second detector system appropriately aligned to detect a flight path or elevation angle must be employed. The detectors are designed so that they are completely insensitive to illumination variations in the orthogonal axis and there is no cross interference between detectors operating in orthogonal planes.

The detector to be described is insensitive to illumination bursts or variations and will continue to provide accurate and non-varying angle indicating output signals whenever the approaching aircraft is maneuvering and the light beam is turned toward and from the detector. Thus, two or more detectors operating with their associated electronic circuits may be employed in a system for directing nighttime aircraft landings or for other applications where the direction of an illuminating source is required.

The detector and associated circuitry may conveniently be subminiaturized and can be manufactured in quantity at relatively low cost by conventional deposition techniques employed in the production of electronic integrated circuitry. The detector array is formed of a relatively large plurality of thin adjacent parallel strips of detector material having a suitable sensitivity to the illumination to be detected. Overlying each of the parallel strips is a mask deposited to reveal open areas comprising a plurality of identical detector elements in series and of a particular configuration on the surface of the detector material. Running longitudinally through each series detector in a detector strip is a deposited electrical conductor for transmitting the photodetector signal to associated external circuitry. The mask pattern is reversed in each adjacent strip and the electrical conductors connected to the detectors of each of these alternate strips of the array are interconnected so that the photocurrents flow in opposite directions in the conductors in alternate strips.

Closely overlying the array of detectors but spaced therefrom is an upper opaque mask having a plurality of narrow parallel slits or transparent bars that are aligned laterally to the longitudinal axis of each of the parallel detector strips. The equal spacing between each slit in the plurality corresponds with the length of each detector element in each parallel strip developments and the center line of each slit is precisely positioned over, and parallel with, a lateral line across the center of each element. Thus, illumination from the source precisely normal to the surface of the top mask will be projected as narrow lines of illumination across the detector array with each projected line crossing the center of the detectors in the adjacent parallel strips.

As mentioned above, the plurality of series connected detectors in adjacent parallel strips have reversed mask patterns so that their respective output currents flow according to the pattern directions. When the projected illumination through the slits of the upper mask fall across the centers of the detectors in adjacent arrays, each detector is equally excited and the photocurrents from adjacent strips are equal so that their difference is therefore equal to zero. But the masks in alternate detector strips are shaped so that there is progressively less irradiation, hence lower photocurrents, as the illumination through the top mask moves in a longitudinal direction from the center of the detector cells. Therefore, as the angle of an illuminating source changes, the detectors in one alternate strip will generate less currents while the other alternate strips of detectors may continue to generate the same, or greater currents depending upon the detector mask design. Thus, as the illumination angle changes, the difference in photocurrents from detectors in alternate strips will increase. It would appear to be a simple task to determine the angle to the illuminating source by measuring the total currents from the alternate strips in the array and performing the operation. Unfortunately the problems associated with performing this division while maintaining a desired sensitivity and dynamic range are formidable and costly and often results in errors that render the approach impractical.

BRIEF DESCRIPTION OF THE INVENTION

Briefly described, the detector array of the invention includes a plurality of elongated adjacent detector strips with each strip being surface masked to display a plurality of identical detector elements connected in series with a photocurrent conductor longitudinally aligned on the surface of the elements in each strip. The element plurality on alternate detector strips are oppositely aligned from those of the adjacent strip so that opposite flowing photocurrents may be obtained from each group of alternate detector strips. The entire detector array underlies, and is spaced from, a parallel opaque mask in a plane having narrow transparent slits that are perpendicular to a longitudinal axis of the detector strips and are spaced from each other by an amount equal to the length of each detector element in the strips. Radiation from an illuminating source striking the mask plane from a source normal to the plane of the detector passes the narrow transverse slits of radiation across the plurality of detector strips and across the center of each element. As the angle of incidence varies from the normal, the transverse radiation slits move longitudinally along the elements. The configuration of each mask overlying the detector strips and forming the plurality of the identical elements conforms to a particular exponential baffle function that permits the direct extraction of the angle of incidence by subtracting the log of the two photocurrents from each group of alternate detectors, an operation that is easily accomplished with commercially available integrated circuits without sacrificing sensitivity, accuracy or reliability.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
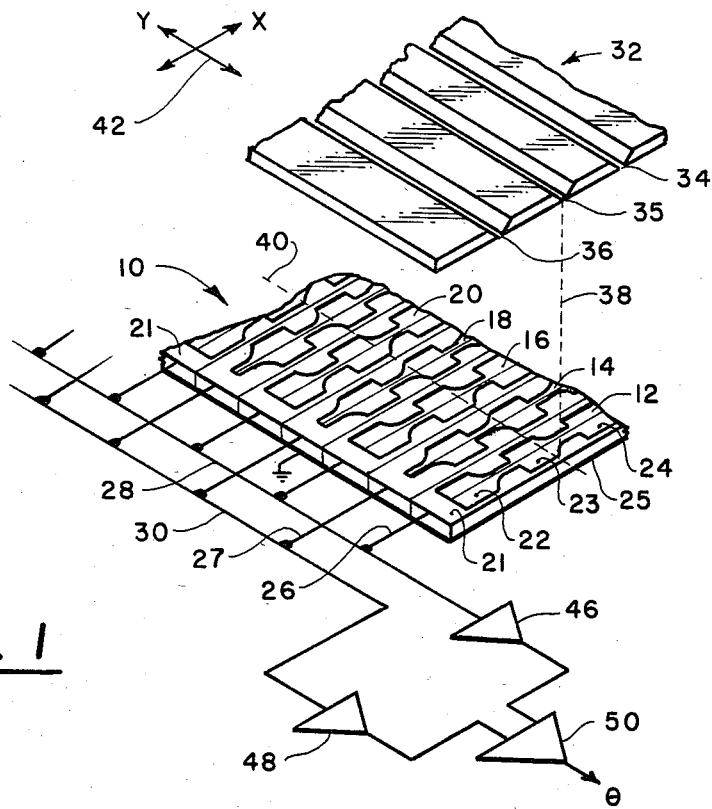
FIG. 1 is a perspective schematic view of a section of the detector array with its overlying slotted mask and electronic circuitry.

Illustrated in FIG. 1 is a section of a detector array 10 comprised of a plurality of adjacent parallel strips 12–20, each formed of a desired detector material that is sensitive to the illumination range to be detected. Each of the parallel strips is coated with an attached overlying opaque mask 21 which exposes a plurality of series connected discrete detector elements such as the elements 22, 23, and 24 on the detector strip 12. The bottom surfaces of all detector strips are coupled to a common conductor 25 and each of the plurality of strips 12–20 includes a top electrical conductor 26 in contact with the top surface of each element in the strip for conducting the photocurrent from each of the series coupled elements in each strip.

As shown in FIG. 1, the series element in adjacent detector strips, such as the strips 12 and 14 or 14 and 16, are reversed in pattern direction and the photocurrent conductors of alternate strips are interconnected. Thus, the conductors from alternate detector strips 12, 16 and 20 are connected to a common bus 28 and the conductors from the alternate strips 14 and 18 are connected to the bus 30.

Overlying the detector array 10 and parallel therewith is a slit mask 32 formed of an opaque material with a plurality of transparent parallel slits 34, 35 and 36 aligned perpendicularly to the axis of each of the plurality of detector strips in the array 10. The spacing between each slit in the slit mask 32 equals the length of each discrete element in the plurality of detector strips and the slit mask is positioned so that radiation originating from a point normal to the surface of the slit mask will be transmitted through the slits 34–36 to the lateral center lines of each adjacent detector element in adjacent strips. Thus, a very narrow bar of irradiation passing through the slit 35, as shown by the dashed line 38, will lie in a transverse direction across the array 10 at the centers of all discrete detector elements in the second column of elements as shown by the dashed line 40.

All discrete detector elements in all of the parallel detector strips of the array 10 are identical in size and shape; only the alignment of the elements in any one detector strip is reversed from the element alignment in the adjacent strips. In the preferred embodiment each discrete detector element, such as the element 23 in the second column of the detector strip 12, is formed by the mask 21 into a first half having an equal width throughout and a second half having the same length but with a width that is reduced exponentially from the center of the element to its end and to the beginning of the next series element 24. The elements in the adjacent detector strips 14 are aligned in a reverse direction. Thus, the narrow strip of illumination passing through the slit 35 of the slit mask 32 and represented by the dashed line 40 will fall across the centers of the adjacent second column elements. Since the adjacent detectors have equal widths at their centers, equal photocurrents will be conducted from their respective conductors 26 and 27.

If the source of illumination shifts in the Y direction as shown by the arrows 42, the radiation represented by the dashed line 40 will remain in its position across the center of the second column detector elements and the detector array is therefore insensitive to irradiation shifts in the Y direction. However, a small shift in the incident angle in the X direction will shift the illumination represented by the dashed line 40 so that the photocurrents from the detector elements in one detector strip will remain unchanged because of the constant detector width, while the photocurrent in adjacent strips will decrease because of the exponentially narrowing widths of the detector elements.

The total photocurrents from all alternate detector strips are added in their respective busses 28 and 30 and are applied to log circuitry and difference circuitry which will subtract the log values to produce an output signal that is directly proportional to the angle of incidence of the illuminating source. Thus, busses 28 and 30 are coupled to the input of commercially available logarithmic compression circuits 46 and 48, respectively, that convert the current values into corresponding natural logarithm values which are applied to a difference amplifier 50 and a suitable scaler that produces an output signal directly proportional in degrees to the angle of incidence of the irradiating source.

Figure 2:
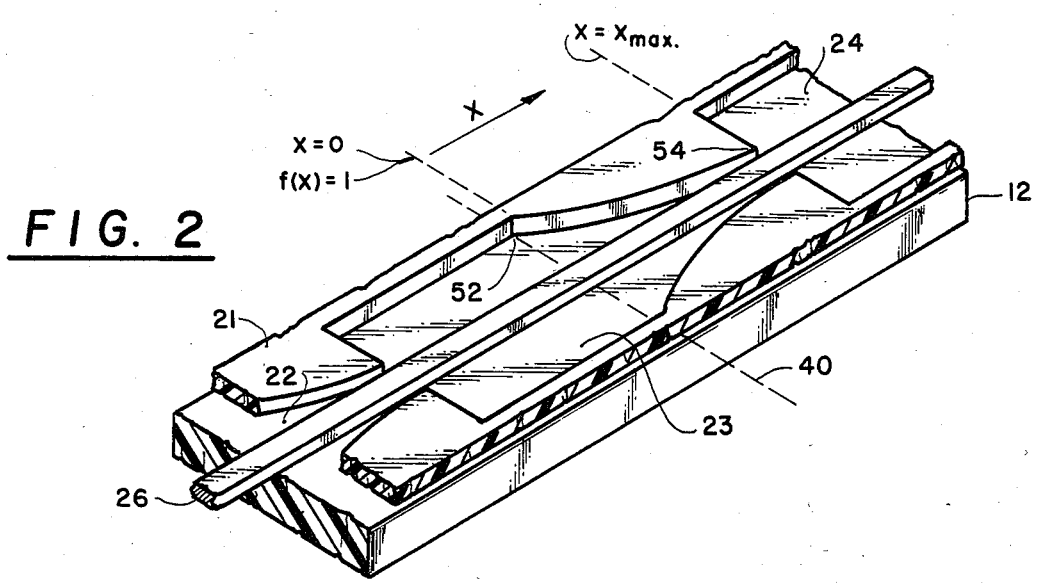
FIG. 2 is a greatly enlarged perspective view of one detector element of the array of FIG. 1.

FIG. 2 is a greatly enlarged view of one discrete detector element, such as the detector element 23 on the detector strip 12, and illustrates the mask 21 and the longitudinal photocurrent conductor 26. The dashed line 40 representing the narrow bar of irradiation passing through slit 35 of the slit mask 32 from a source at a zero angle of the incidence in the X direction, is shown lying across the lateral center line of the element 23. Half of the element is of constant width as described above and the second half of the element 23 is exponentially reduced in width to produce a lower photocurrent when the transverse irradiating bar, or line 40, moves in that direction along the element by a change in angle of incidence in the X direction of the irradiating source. It is preferred that the ratio of total photocurrents $I_1/I_2$, produced from alternate detector strips is:

$$\frac{I_1}{I_2} = e^{K_1\theta}$$

where $K_1$ is a scale factor, and $\theta$ is the angle of incidence.

If the widths of the slits 34–36 in the slit mask 32 are very small, then:

$$e^{K_1\theta} = f(X) = e^{(K_1 sin^{-1}\frac{n_1}{n_e} \cdot \frac{X}{\sqrt{X^2+H^2}})}$$

where $n_1$ is the Index of Refraction in the mask material $n_e$ is the Index of Refraction in air X is the position in the X direction along the element H is the spacing between array 10 and slit mask 32.

This equation defines the exponential curve of the detector elements.

In FIG. 2, the lateral center 52 of the element 23, or the point where X=0, and is shown at the dashed line 40, may be represented as:

$f(X) = 1$.

The curve then follows the above equation to its end 54, at $X = X_{max}$.

The size of the array 10, the detector elements and the parallel slit mask 12 may be of any desired size. If a detector array is miniaturized, the length of each discrete detector element, such as the element 23, may be approximately 0.60 mm and have a maximum width of 0.10 mm. The width of the narrow section of the element, for example, at the point 54 or where $X = X_{max}$ in the curve definition equation may be approximately 0.02 mm and the width of the photocurrent conductor 26 may be 0.01 mm. In this typical detector, the total detector array 10 may contain 100 or more detector strips, such as the strips 12–20, and each strip may contain 20 or more discrete detector elements such as the elements 22–24.

It is to be understood that the dimensions of this typical detector are illustrative only and that the physical size of the array and dimensions of the detector elements are a matter of choice to be varied as desired by altering the value of the scale factor in the curve definition equation.

What is claimed is:

1. A detector for determining the angle of incidence of an illuminating source in a plane normal to said detector, said detector including:
   an opaque planar slit mask having at least one narrow transparent straight slit in the opaque plane of said mask;
   a detector array in a plane parallel with and spaced from said planar slit mask, said detector array including:
      a plurality of adjacent identical detector elements, the longitudinal axis of each of said plurality of elements being parallel with each other and perpendicular to said transparent slit;
      the surface of each of said plurality of elements adjacent said slit mask being configured to produce a maximum detector photocurrent from irradiation through said slit falling across the first end of said element surface and a minimum detector photocurrent from irradiation through said slit falling across the second end of said element surface;
      the pattern configuration on the surface of each of said plurality of detector elements being reversed from that on the surface of adjacent elements whereby said first end of one of said elements lies adjacent the second end of an adjacent one of said elements;
   first conductive means coupled to the first surface of said plurality of detector elements in said array;
   second conductive means coupled to the second surface of alternate ones of said plurality of adjacent detector elements; and
   log means associated with said detector elements for generating first and second log signals corresponding to photocurrents generated by said adjacent elements.

2. The detector claimed in claim 1 wherein said detector array includes a plurality of adjacent strips, each strip forming a plurality of detector elements, the plurality of elements in each of said strips being connected in series with one of said second conductive means, the pattern configuration of detector elements in each of said plurality of strips being reversed from the pattern configuration of elements in adjacent strips.

3. The detector claimed in claim 2 wherein the pattern configuration of each of said detector elements includes said log means and wherein the longitudinal movement of a thin transverse light beam along said element will generate, through said first and second conductive means, photocurrents having an exponential amplitude ratio.

4. The detector claimed in claim 2 wherein each of said strips of detector elements is formed of a detector material having an attached overlying opaque mask having a pattern revealing each of said plurality of detector elements and said second conductive means lying along the top longitudinal center of each of said plurality of elements.

5. The detector claimed in claim 4 wherein each of said plurality of elements revealed by said overlying mask includes first and second interconnected detector sections each occupying half the length of each element, said first section having a constant width throughout its length, said second section having a width at its first end that corresponds with that of said interconnected first section and being reduced therefrom to the second end of said section according to an exponential curve.

6. The detector claimed in claim 5 wherein the second section of each of said plurality of detector elements is reduced from the first end to the second end of said section in a curve following the equation:

$$f(X) = e^{(K\sin^{-1}\frac{n1}{n2}\; \frac{X}{\sqrt{X^2+H^2}})}$$

wherein
   n1 = Index of Refraction of said overlying mask
   n2 = Index of Refraction of air
   X = Longitudinal position from first end of said second section
   H = Spacing between the surface of said detector element and said opaque planar slit mask,
   K = a scale factor.

7. The detector claimed in claims 2, 3 5, or 6 further including first and second electrical conductors, said first conductor coupled to said conductive means in alternate strips of said detector element, said second conductor coupled to the remaining strips of detector elements, said detector further including first and second logarithmic circuits respectively coupled to said first and second conductors for generating first and second output signals proportional to the natural log of the photocurrents in said first and second conductors, respectively, and difference circuitry coupled to said first and second logarithmic circuits for subtracting said first and second output signals to produce an output signal directly proportional to the angle of incidence of irradiation in a plane normal to said detector.

* * * * *